(12) United States Patent
Tanaka et al.

(10) Patent No.: US 7,630,621 B2
(45) Date of Patent: Dec. 8, 2009

(54) INTERCHANGEABLE LENS CAMERA, CAMERA BODY THEREOF AND LENS UNIT

(75) Inventors: Hiroshi Tanaka, Minato-ku (JP); Mikio Watanabe, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 588 days.

(21) Appl. No.: 11/583,004

(22) Filed: Oct. 19, 2006

(65) Prior Publication Data

US 2007/0092240 A1   Apr. 26, 2007

(30) Foreign Application Priority Data

Oct. 19, 2005   (JP)   ............... 2005-304886

(51) Int. Cl.
*G03B 13/36* (2006.01)
(52) U.S. Cl. .................................... 396/106
(58) Field of Classification Search ............... 396/106; 348/345, 348
See application file for complete search history.

(56) References Cited

U.S. PATENT DOCUMENTS 4,602,861 A * 7/1986 Taniguchi et al. ............. 396/81

6,249,311 B1 * 6/2001 Rouse et al. ................ 348/164
7,106,511 B2 * 9/2006 Grot et al. ................... 359/566
2006/0066957 A1 * 3/2006 Fukui ......................... 359/689
2007/0258708 A1 * 11/2007 Ide ............................... 396/89

FOREIGN PATENT DOCUMENTS

| JP | 2000-050130 A | 2/2000 |
|---|---|---|
| JP | 2000-266988 A | 9/2000 |
| JP | 2003-287674 A | 10/2003 |

* cited by examiner

*Primary Examiner*—W B Perkey
(74) *Attorney, Agent, or Firm*—Sughrue Mion, PLLC

(57) ABSTRACT

In a camera body of an electronic camera, first information representing spectral characteristics of auxiliary light is read out of a nonvolatile memory under control of a CPU of the camera body. The first information is sent to a serial driver of a lens unit via a serial driver of the camera body. The lens unit includes a selector switch for changing a color signal to be inputted into an AE/AF detection circuit. In the lens unit, the first information is compared with second information representing spectral characteristics of the color signal which is changeable by the selector switch. On the basis of a comparison result, the selector switch is operated under control of a CPU of the lens unit such that the color signal having the spectral characteristics identical with the first information is inputted into the AE/AF detection circuit.

18 Claims, 15 Drawing Sheets

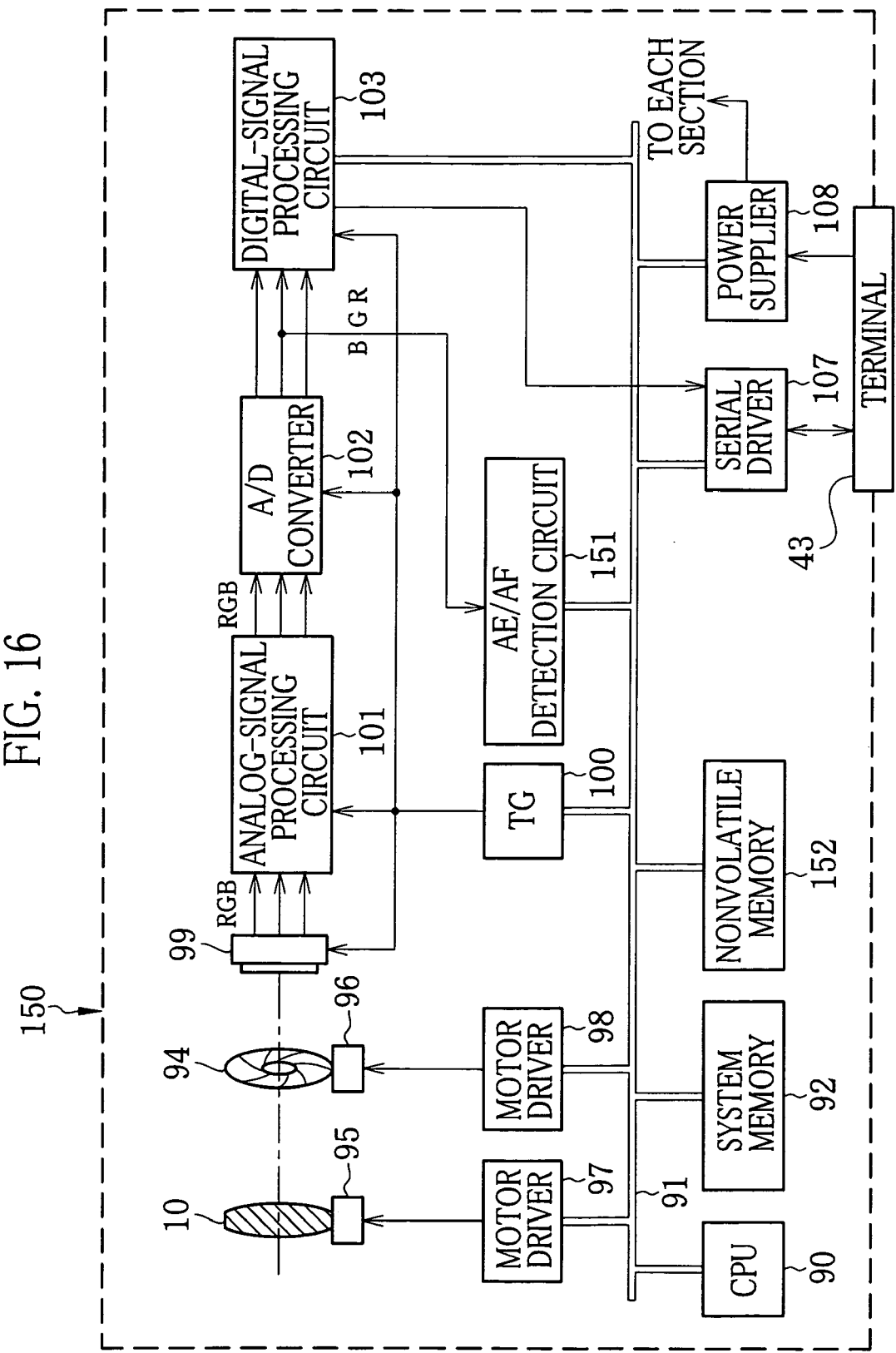

INTERCHANGEABLE LENS CAMERA, CAMERA BODY THEREOF AND LENS UNIT

FIELD OF THE INVENTION

The present invention relates to an interchangeable lens camera in which a lens unit having an imaging optical system and a solid-state image sensor is detachably attached to a camera body, and the present invention further relates to the lens unit and the camera body.

BACKGROUND OF THE INVENTION

An electronic camera in which an image signal is converted into digital image data is popularized. The image signal is obtained by taking a subject image with a solid-state image sensor of a CCD and so forth. The digital image data is stored in a recording medium of a built-in memory, a memory card and so forth. Some of the electronic cameras are the so-called interchangeable lens camera in which a lens unit having an imaging optical system and a solid-state image sensor is detachably attached to a camera body (see Japanese Patent Laid-Open Publication No. 2000-50130).

By the way, many of the digital cameras currently put on the market calculate a focus evaluation value, which represents sharpness of a subject image, from the image data. This kind of the electronic camera is equipped with an autofocus (AF) function for automatically performing focus adjustment by using a method in which a position of the maximum focus evaluation value is defined as a focal position.

With respect to the electronic camera adopting a TTL phase difference detection method as the method for autofocus, there is a proposed method in which a color temperature of subject light is measured to correct an error of focus detection to be caused by color aberration occurring in accordance with wavelength components of the subject light (see Japanese Patent Laid-Open Publication No. 2000-266988).

Meanwhile, some of the electronic cameras equipped with the AF function are provided with an auxiliary-light emitting device for emitting the auxiliary light to a subject in order to enable the AF function in a dark place and so forth (see Japanese Patent Laid-Open Publication No. 2003-287674). The camera described in the Publication No. 2003-287674 uses a green LED as a light source of the auxiliary-light emitting device. The green LED has spectral characteristics resembling visibility characteristics.

As described in the above-noted Publication No. 2000-266988, it is known that the error of focus detection is caused by the color aberration occurring in accordance with the wavelength components of the subject light. When the auxiliary light is emitted to the subject, the color temperature of the subject light is strongly affected by the auxiliary light. Thus, the error of the focus detection is likely to be caused. In other words, when only the light of the green LED is used as the auxiliary light such as the camera described in the Publication No. 2003-287674, it is necessary to perform correction in accordance with the spectral characteristics.

In case of the unicolor auxiliary light, if the focus evaluation value is calculated by using the whole data of three colors of R, G and B without correcting the color aberration, the colors except for the color of the auxiliary light do not contribute to the calculation and are likely to affect a result of the calculation as noise. Thus, it is preferable that the spectral characteristics of the auxiliary light coincide with spectral characteristics of the color of the data used for calculating the focus evaluation value.

However, as to the electronic camera described in the Publication No. 2000-50130, although the auxiliary-light emitting device of the camera body is controlled by a controller of an imaging unit (lens unit), it is impossible to judge the spectral characteristics of the auxiliary light at the lens unit side. Consequently, even if the auxiliary light has the sole color, there is no choice for using the data of three colors of R, G and B in calculating the focus evaluation value. Thus, there arises a problem in that the error of the focus detection is likely to be caused.

SUMMARY OF THE INVENTION

In view of the foregoing, it is a primary object of the present invention to provide an interchangeable lens camera, a camera body thereof and a lens unit in which focus detection is surely performed without causing an error when auxiliary light is applied to a subject.

In order to achieve the above and other objects, the interchangeable lens camera according to the present invention comprises a camera body and a lens unit detachably attached to the camera body. The lens unit includes a solid-state image sensor for taking a subject image having passed through an imaging optical system. The camera body includes an auxiliary-light emitter, a first memory, a first communication section and a first controller. The auxiliary-light emitter emits auxiliary light to be used for autofocus. The first memory stores first information representing spectral characteristics of the auxiliary light. The first communication section communicates various signals with the lens unit. The first controller controls operations of the respective parts of the camera body. In addition, the first controller reads the first information from the first memory and sends the first information to the lens unit via the first communication section. The lens unit includes a focus-evaluation-value calculator, a second memory, a selector, a second communication section and a second controller. The focus-evaluation-value calculator calculates a focus evaluation value representing sharpness of the subject image. The second memory stores second information representing spectral characteristics of each of color signals. The selector changes the color signal to be inputted into the focus-evaluation-value calculator. The second communication section communicates the various signals with the camera body via the first communication section. The second controller controls operations of the respective parts of the lens unit. In addition, the second controller compares the first information, which is received from the camera body via the second communication section, with the second information stored in the second memory. The selector is operated such that the color signal corresponding to the second information identical with the first information is inputted into the focus-evaluation-value calculator.

It is preferable that at least one of the camera body and the lens unit includes an attachment detector for detecting attachment of the camera body and the lens unit. After the attachment detector has detected the attachment, the first and second communication sections perform the transmission of the first information.

It is preferable that the lens unit includes a brightness signal producer for producing a brightness signal from the color signal. In this case, the selector is adapted to be capable of selecting the brightness signal in addition to the color signals. When the first information discords with the second information or when the first information is not received, the second controller operates the selector such that the brightness signal is inputted into the focus-evaluation-value calculator.

It is preferable that a signal for prohibiting the actuation of the auxiliary-light emitter is sent to the camera body by the second controller when the first information discords with the second information or when the first information is not received. In this case, it is preferable that the camera body is provided with a display for indicating that the auxiliary-light emitter is inactive.

In another embodiment, the interchangeable lens camera comprises a camera body and a lens unit detachably attached to the camera body. The lens unit includes a solid-state image sensor for taking a subject image having passed through an imaging optical system. The camera body includes an auxiliary-light emitter, a first memory, a selector, a first communication section and a first controller. The auxiliary-light emitter is capable of emitting plural kinds of auxiliary light which have different spectral characteristics and are used for autofocus. The first memory stores first information representing the spectral characteristics of the auxiliary light. The selector selects one of the plural kinds of the auxiliary light to be emitted. The first communication section communicates various signals with the lens unit. The first controller controls operations of the respective parts of the camera body. The lens unit includes a focus-evaluation-value calculator, a second memory, a second communication section and a second controller. The focus-evaluation-value calculator calculates a focus evaluation value representing sharpness of the subject image. The second memory stores second information representing spectral characteristics of a color signal to be inputted into the focus-evaluation-value calculator. The second communication section communicates the various signals with the camera body via the first communication section. The second controller controls operations of the respective parts of the lens unit. The second controller reads the second information form the second memory. The read second information is sent to the first communication section via the second communication section. The first controller compares the first information, which is stored in the first memory, with the second information. On the basis of a comparison result, the selector is operated such that the auxiliary light having the spectral characteristics identical with the second information is emitted from the auxiliary-light emitter.

It is preferable that at least one of the camera body and the lens unit includes an attachment detector for detecting attachment of the camera body and the lens unit. After the attachment detector has detected the attachment, the first and second communication sections perform the transmission of the second information.

It is preferable that the first controller prohibits the actuation of the auxiliary-light emitter when the first information discords with the second information or when the second information is not received. In this case, it is preferable that the camera body is provided with a display for indicating that the operation of the auxiliary-light emitter is inactive.

According to the present invention, it is possible to make the spectral characteristics of the auxiliary light coincide with the spectral characteristics of the color signal to be used for calculating the focus evaluation value. Thus, when the auxiliary light is applied to the subject, focus detection is surely performed without causing an error.

BRIEF DESCRIPTION OF THE DRAWINGS

FIG. 16 is a block diagram showing the other embodiment of the lens unit.

DESCRIPTION OF THE PREFERRED EMBODIMENTS

Figure 1:
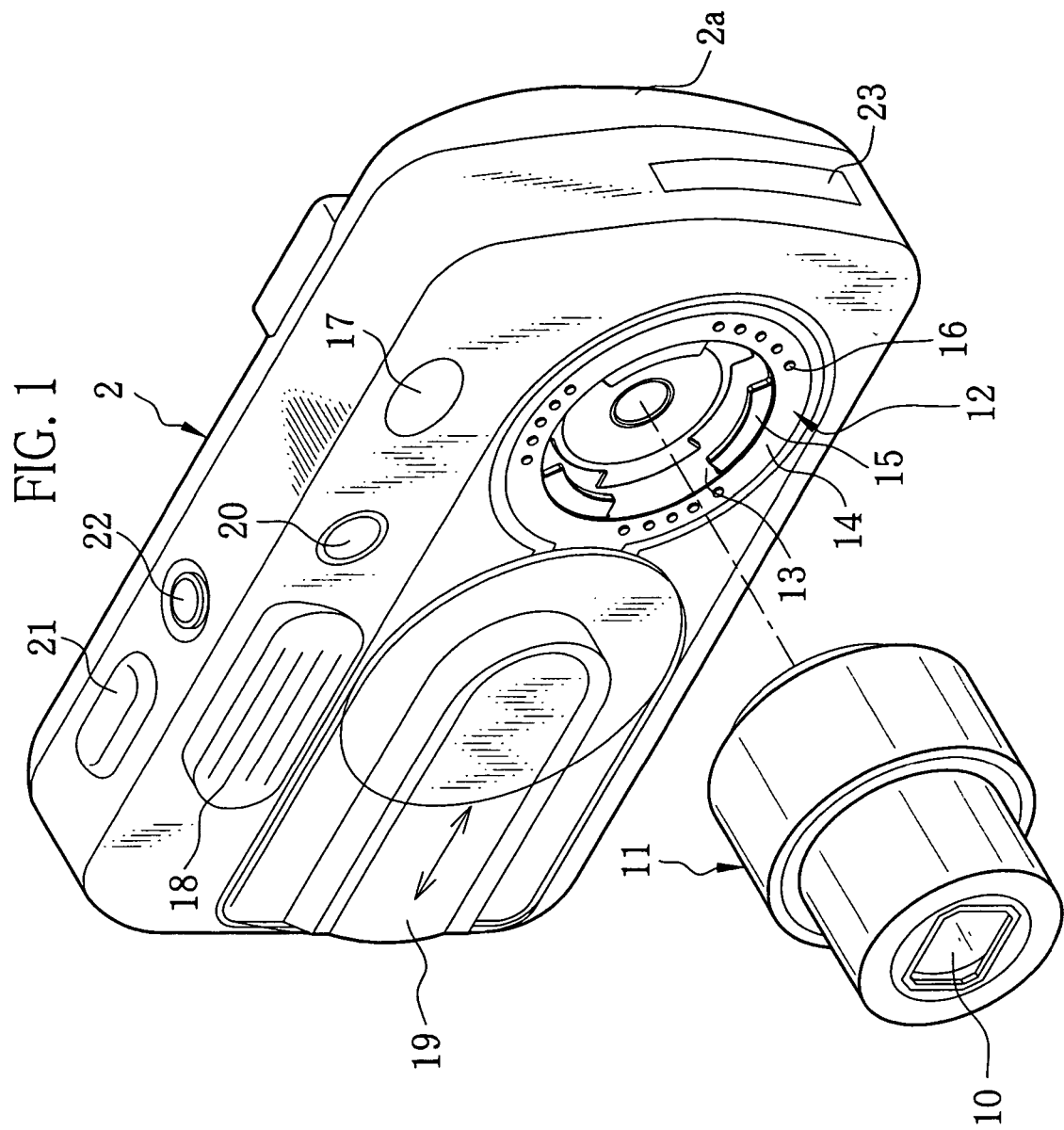
FIG. 1 is a front perspective view of an electronic camera.

In FIG. 1, an electronic camera 2 of the present invention is a so-called interchangeable lens camera in which a lens unit 11 including a taking lens 10 is detachably attached to a front side of a camera body 2a via a mount 12.

The mount 12 is composed of a mount ring 14 and three bayonet claws 15. The mount ring 14 is disposed around an opening 13 of the camera body 2a. The bayonet claws 15 project from the inner circumference of the mount ring 14. In attaching the lens unit 11 to the camera body 2a, the mount ring 14 abuts on a mount ring 41 (see FIG. 3) of the lens unit 11. At the same time, the bayonet claw 15 engages with a claw receiver 42 (see FIG. 3) of the lens unit 11.

Terminals 16 are disposed on the mount ring 14. The terminal 16 is fitted into a hole formed in the mount ring 14 and is biased by a spring (not shown) so as to project from the hole. The terminals 16 include a signal terminal and a power-supply terminal. By the signal terminal, signals are sent to and received from the lens unit 11 via a serial driver 68 (see FIG. 4). The power-supply terminal is prepared for supplying electric power of a power supplier 70 (see FIG. 4) to the lens unit 11. When the lens unit 11 is completely attached, the terminal 16 comes into contact with a terminal 43 (see FIG. 3) of the lens unit 11. In virtue of this, the camera body 2a and the lens unit 11 are electrically connected.

A front side of the camera body 2a is provided with an object-side viewfinder window 17, a flash window 18, a barrier 19 and an auxiliary-light window 20 besides the mount 12. Moreover, a top side of the camera body 2a is provided with a release button 21 and a power button 22. Further, a lateral side of the camera body 2a is provided with a slot into which a memory card 59 (see FIG. 4) is removably inserted, and a lid 23 for covering a USB connector 54 (see FIG. 4).

The release button 21 is adapted to be depressed in two steps. After framing of a subject, the release button 21 is lightly depressed (halfway) to perform various shooting preparation processes of automatic exposure adjustment (AE), automatic focus adjustment (AF) and so forth. In this state, the release button 21 is depressed again (fully depressed) to convert an image signal of one frame, for which the shooting preparation processes have been performed, into image data. After that, image processing and compression processing are performed for the image data such as described later. The processed image data is stored in the memory card 59. Incidentally, operational signals of the release button 21 are sent in real time to both of the camera body 2a and the lens unit 11 through exclusive signal lines which are not shown.

Figure 2:
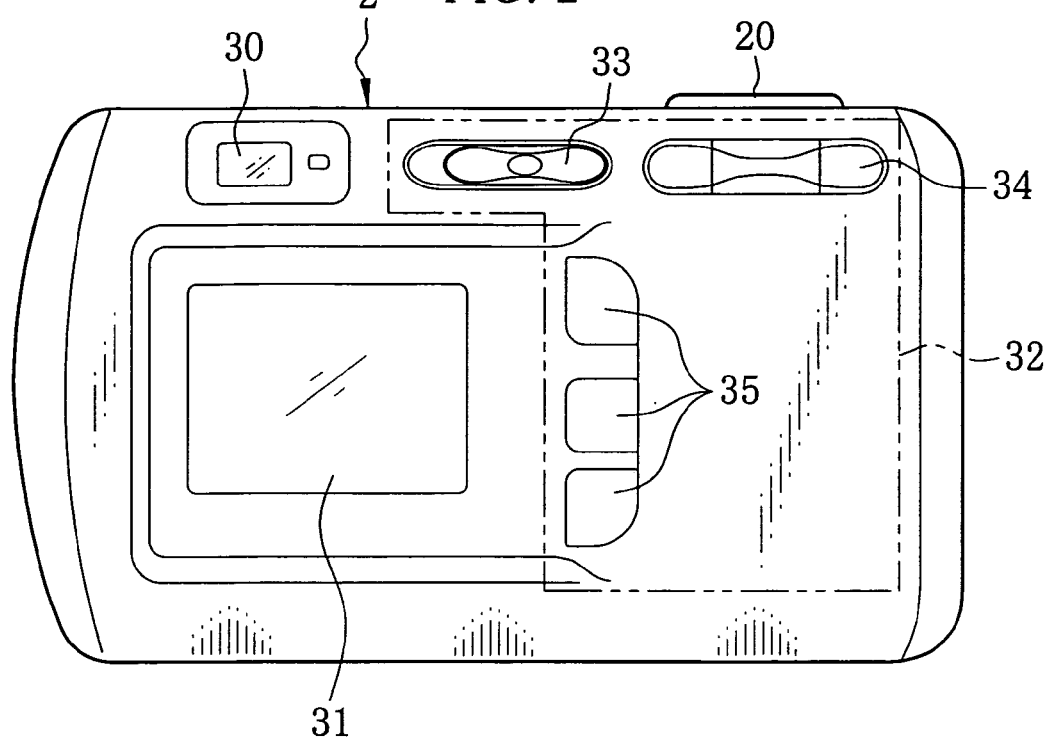
FIG. 2 is a rear perspective view of the electronic camera.

In FIG. 2, a rear side of the electronic camera 2 is provided with an eye-side viewfinder window 30, a liquid crystal display (LCD) 31 and an operating portion 32. The LCD 31 displays a taken image, a so-called through image and various menu pictures. The operating portion 32 is composed of a mode changing switch 33, a zoom operating button 34 and menu buttons 35. The zoom operating button 34 changes a magnification of a zoom lens of the taking lens 10 between a wide-angle end and a telephoto end. The menu button 35 is operated in displaying the menu picture on the LCD 31 and in determining selection contents.

The electronic camera 2 is capable of selecting a still-image shooting mode for taking a still image, a moving-image shooting mode for taking a moving image, a reproduction mode for displaying the taken image on the LCD, and a setting mode for carrying out various settings. Changing the modes is performed by sliding the mode changing switch 33. Under the moving-image shooting mode, surround voice is recorded via a microphone, which is not shown, in synchronism with shooting of the moving image.

Figure 3:
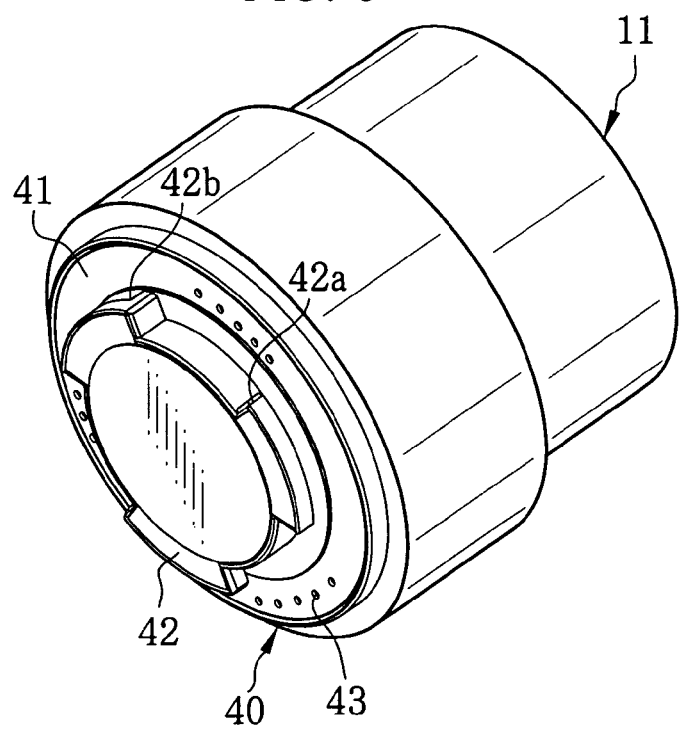
FIG. 3 is a perspective view of a lens unit.

In FIG. 3, a rear side of the lens unit 11 is provided with a mount 40 to confront the mount 12 of the camera body 2a. The mount 40 is composed of the mount ring 41 and the claw receiver 42 comprising a recess 42a and a contact portion 42b. The bayonet claw 15 is fitted into the recess 42a and abuts on the contact portion 42b.

On the mount ring 41, terminals 43 are disposed so as to correspond to the terminals 16 of the mount ring 14. The terminal 43 is embedded in a hole formed in the mount ring 40. The terminals 43 include a signal terminal and a power-supply terminal. By the signal terminal, signals are sent to and received from the camera body 2a via a serial driver 107 (see FIG. 6). The power-supply terminal is prepared for supplying electric power to a power supplier 108 (see FIG. 6) from the camera body 2a.

Figure 4:
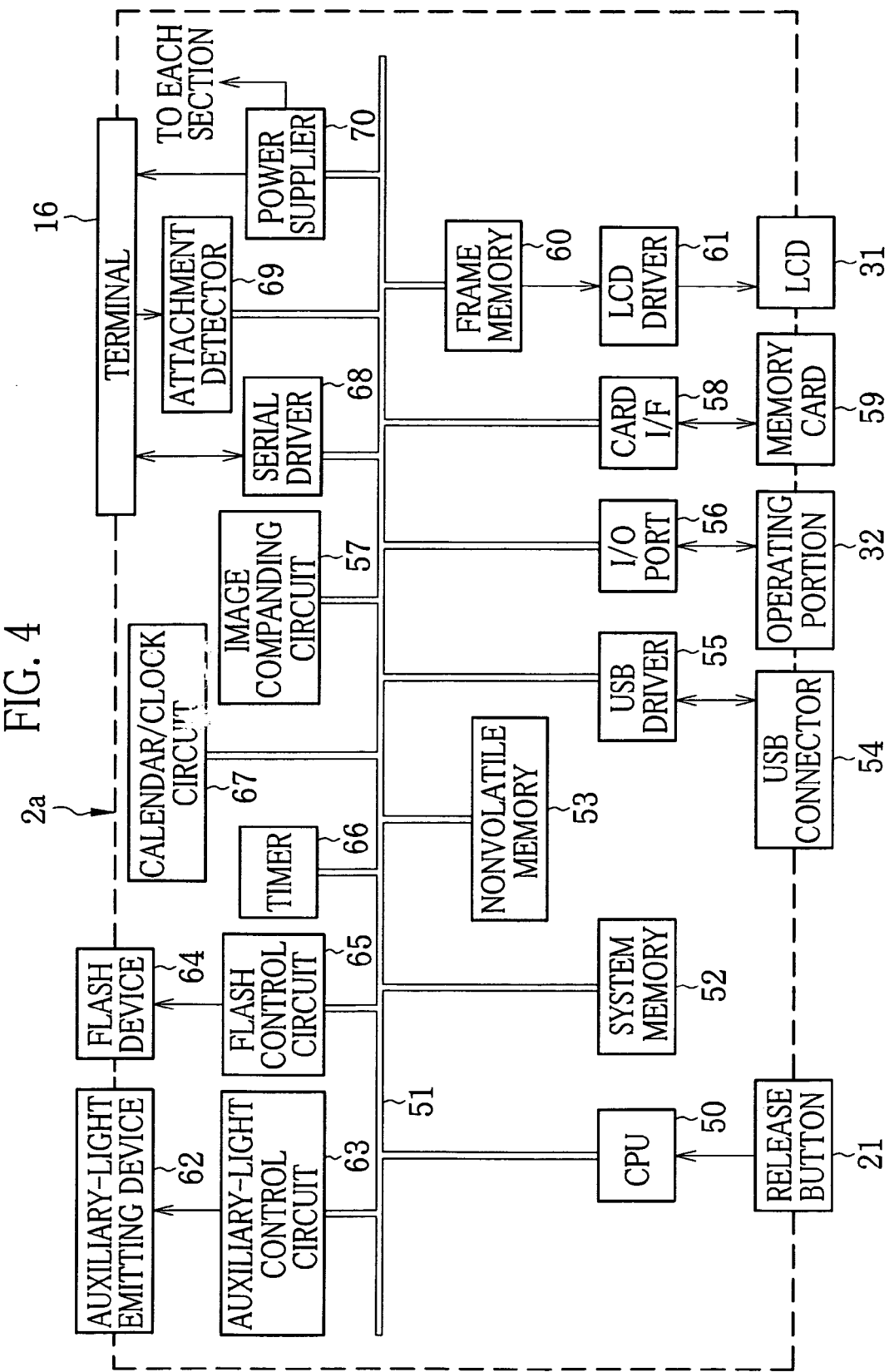
FIG. 4 is a block diagram showing an internal structure of a camera body.

In FIG. 4 showing an electrical structure of the camera body 2a, a CPU 50 integrally controls whole sections of the camera body 2a via a bus 51. A system memory 52 is composed of a ROM and a RAM. The ROM stores various programs for executing sequence of shooting. The RAM temporarily stores various data which is necessary for executing the programs. A nonvolatile memory 53 is made of a rewritable recording medium of an EEPROM and so forth to store various data which is necessary for actuating the camera body 2a. Moreover, the nonvolatile memory 53 stores information (hereinafter referred to as first information) representing spectral characteristics of auxiliary light described later. The program and the data stored in the ROM of the system memory 52 and the nonvolatile memory 53 are sent to the RAM used as a working memory, and on the basis thereof, the CPU 50 controls the respective sections of the camera body 2a.

A USB cable is connected to the USB connector 54 to transmit the data via a USB driver 55 between the camera body 2a and an external equipment of a personal computer and so forth. The operating portion 32 is connected to an I/O port 56 to send a signal, which is inputted via the operating portion 32, to the CPU 50. In accordance with the signal sent from the I/O port 56, the CPU 50 activates the respective sections of the camera body 2a.

An image companding circuit 57 compresses the image data, for which various signal processes have been performed by a digital-signal processing circuit 103 (see FIG. 6) of the lens unit 11, in a predetermined compression format (for example, JPEG format). The compressed image data is stored in the memory card 59 via a card I/F 58.

The image data of one frame for which the various signal processes have been performed by the digital-signal processing circuit 103 is written in a frame memory 60. An LCD driver 61 converts the image data written in the frame memory 60, into NTSC format. The converted image data is displayed on the LCD 31.

Figure 5:
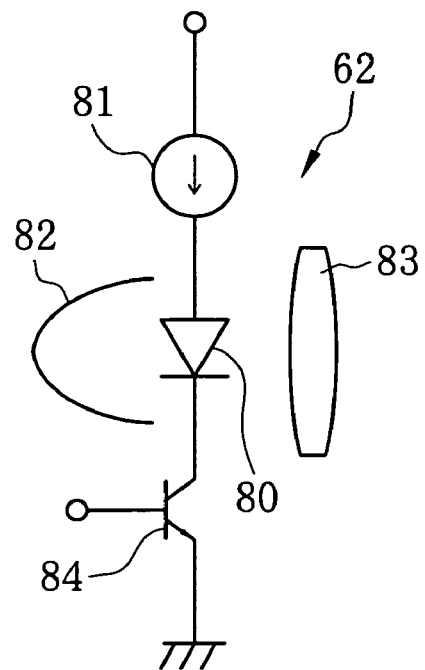
FIG. 5 is a schematic illustration showing a structure of an auxiliary-light emitting device.

An auxiliary-light emitting device 62 is controlled by an auxiliary-light control circuit 63 to emit auxiliary light from the auxiliary-light window 20 toward a subject. As shown in FIG. 5, the auxiliary-light emitting device 62 comprises an LED 80, a constant current source 81 for supplying electric power to the LED 80, a reflector 82 for reflecting the light of the LED 80 to the auxiliary-light window 20, and a condenser lens 83 for condensing the light of the LED 80 toward the center of an angle of view.

An AE/AF detection circuit 105 (see FIG. 6) described later detects brightness of a subject. When a detection result of the subject brightness is a prescribed value or less under the still-image shooting mode, the LED 80 is turned on by a transistor 84 of the auxiliary-light control circuit 63 at a time of AF performed in association with the half depression of the release button 21. The LED 80 is turned off upon completion of AF. Incidentally, the auxiliary-light emitting device 62 is designed such that a light emission direction of the LED 80 intersects with an optical axis of the lens unit 11 at an arrival limit point of the auxiliary light, which is determined from sensitivity of a CCD 99 (see FIG. 6) and intensity of the light emitted from the LED 80.

In FIG. 4, a flash device 64 is controlled by a flash control circuit 65 to emit a flashlight from the flash window 18 toward a subject. A timer 66 counts a shooting delay time at a time of self-shooting, for instance. A calendar/clock circuit 67 manages shooting date and time, and generates system clocks necessary for actuating the camera body 2a.

The serial driver 68 communicates the image data and the various control signals with the lens unit 11 through the terminals 16. An attachment detector 69 detects attachment and detachment of the lens unit 11. Further, the attachment detector 69 sends the detection result to the CPU 50. As to a method for detecting the attachment, one of the terminals 16 of the camera body 2a is pulled up to a predetermined voltage and the corresponding terminal 43 of the lens unit 11 is connected to the ground. An output of a signal line connected to the terminal 16 is polled to confirm the attachment and the detachment (the output is low when the lens unit 11 is attached, and is high when the lens unit 11 is detached).

At the moment that the attachment detector 69 has detected the attachment of the lens unit 11 and the camera body 2a, the CPU 50 reads out the first information from the nonvolatile memory 53. The read information is sent to the lens unit 11 via the serial driver 68.

The power supplier 70 supplies electric power of a battery to each section of the electronic camera 2. In addition, the power supplier 70 supplies the electric power to the lens unit 11 via the terminal 16. The power supplier 70 is provided with an A/D converter for monitoring an output voltage, a DC/DC converter for converting the voltage of the battery into a predetermined voltage suitable for each section, a power-supply control circuit for controlling an order and timing for activating the respective sections in turning on and off the power source, and so forth.

Figure 6:
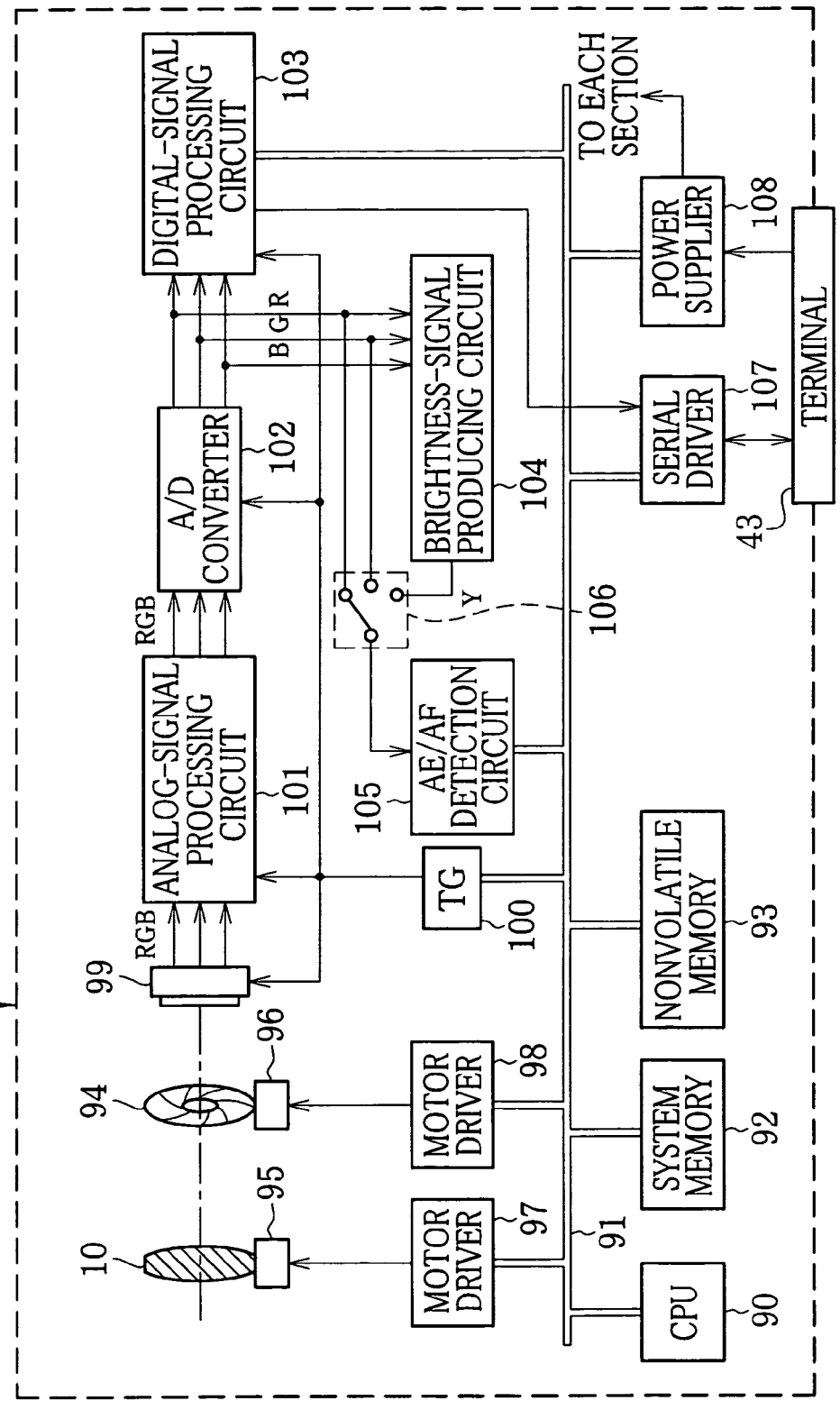
FIG. 6 is a block diagram showing an interior structure of the lens unit.

In FIG. 6 showing an electrical structure of the lens unit 11, a CPU 90 integrally controls whole sections of the lens unit 11 via a bus 91. A system memory 92 is composed of a ROM and a RAM. The ROM stores various programs and the RAM temporarily stores various data which is necessary for executing the programs. A nonvolatile memory 93 is made of a rewritable recording medium of an EEPROM and so forth to store various data which is necessary for actuating the lens unit 11. Moreover, the nonvolatile memory 93 stores information (hereinafter referred to as second information) representing spectral characteristics of color signals, which are changeable by a selector switch 106 and are described later. The program and the data stored in the ROM of the system memory 92 and the nonvolatile memory 93 are sent to the RAM used as a working memory, and on the basis thereof, the CPU 90 controls the respective sections of the lens unit 11.

A lens motor 95 and an iris motor 96 are respectively connected to the taking lens 10 and a stop 94 composing an imaging optical system. The motors 95 and 96 are stepping motors controlled by drive pulses which are sent from motor drivers 97 and 98 connected to the CPU 90. In response to the half depression of the release button 21, the motors 95 and 96 perform the shooting preparation process.

The lens motor 95 moves the zoom lens of the taking lens 10 to the wide-angle end or the telephoto end in association with the operation of the zoom operating button 34. Further, the lens motor 95 moves a focus lens of the taking lens 10 in accordance with a subject distance and a magnification of the zoom lens to perform focus adjustment so as to make shooting conditions optimum. The iris motor 96 actuates the stop 94 to perform exposure adjustment.

Behind the taking lens 10, the CCD 99 is disposed to take a subject image having passed through the taking lens 10. A timing generator (TG) 100 controlled by the CPU 90 is connected to the CCD 99. On the basis of a timing signal (clock pulse) inputted from the TG 100, a shutter speed of an electronic shutter is determined.

An image signal outputted from the CCD 99 is inputted into an analog-signal processing circuit 101, which outputs the image signal as image data of R, G and B accurately corresponding to a stored charge amount of each cell of the CCD 99. The image data is amplified at a predetermined amplification factor. An A/D converter (A/D) 102 converts the analog image data amplified by the analog-signal processing circuit 101, into digital image data.

The digital-signal processing circuit 103 performs various signal processes of edge enhancement, gamma correction, white-balance adjustment and so forth for the digital image data outputted from the A/D 102. A brightness-signal producing circuit 104 produces a brightness signal Y and color-difference signals Cr and Cb on the basis of the image data processed by the digital-signal processing circuit 103.

The AE/AF detection circuit 105 detects the subject brightness to detect whether or not an exposure amount, or the shutter speed of the electronic shutter and an f-number of the stop 94 are suitable for shooting. In addition, the AE/AF detection circuit 105 calculates a focus evaluation value, which represents sharpness of the subject, from the image data outputted from the A/D 102 to detect whether or not the focus adjustment of the taking lens 10 is suitable for shooting. The AE/AF detection circuit 105 sequentially sends the detection results to the CPU 90 via the bus 91 at the time of half depression of the release button 21. The CPU 90 controls the operations of the taking lens 10, the stop 94 and the CCD 99 on the basis of the detection result sent from the AE/AF detection circuit 105.

The selector switch 106 controlled by the CPU 90 is connected to the A/D 102, the brightness-signal producing circuit 104 and the AE/AF detection circuit 105. The selector switch 106 is normally connected to a terminal of the brightness signal Y outputted from the brightness signal producing circuit 104. Among the three signals of the brightness signal Y and the color signals R and G of the image data outputted from the A/D 102, the signal to be inputted into the AE/AF detection circuit 105 is changed.

The CPU 90 compares the second information, which is stored in the nonvolatile memory 93, with the first information in receiving the first information from the lens unit 11 via the serial driver 107 described later. On the basis of the comparison result of the CPU 90, the selector switch 106 is operated so as to input the color signal, which has the spectral characteristics identical with that of the first information, into the AE/AF detection circuit 105.

In other words, when a red LED is used as the LED 80 and the first information represents red spectral characteristics, the selector switch 106 is change to the terminal of the color signal R. Meanwhile, when a green LED is used as the LED 80 and the first information represents green spectral characteristics, the selector switch 106 is change to the terminal of the color signal G.

In the meantime, when a white light source of the flash device 64 or the like is used as the light source of the auxiliary-light emitting device 62 and the first information discords with the second information, the selector switch 106 is changed to the terminal of the brightness signal Y. In case the first information is not stored in the nonvolatile memory 53 from the beginning, the first information is never received. Also in such a case, the selector switch 106 is changed to the terminal of the brightness signal Y.

The serial driver 107 sends the digital image data, which is outputted from the digital-signal processing circuit 103, to the camera body 2a, for instance. The serial driver 107 communicates the data and the various control signals with the camera body 2a through the terminals 43.

The power supplier 108 supplies the electric power, which is supplied from the power supplier 70 of the camera body 2a via the terminal 43, to the respective sections of the lens unit 11. The power supplier 108 is provided with an A/D converter, a DC/DC converter, a power-supply control circuit and so forth, similarly to the power supplier 70.

Next, an operation of the electronic camera 2 having the above structure is described below with reference to flowcharts shown in FIGS. 7 to 9. First of all, the barrier 19 is moved from a shield position to an exposure position in attaching the lens unit 11 to the camera body 2a. After that, both of the mount rings 14 and 41 abut on each other so as to insert the bayonet claw 15 into the recess 42a of the claw receiver 42. Successively, the lens unit 11 is rotated in clockwise direction in FIG. 1 so as to make the bayonet claw 15 abut on the contact portion 42b of the claw receiver 42. In virtue of this, the lens unit 11 is attached to the camera body 2a via the mounts 12 and 40. At this time, the terminals 16 come into contact with the terminals 43 to electrically connect the lens unit 11 and the electronic camera 2.

Figure 7:
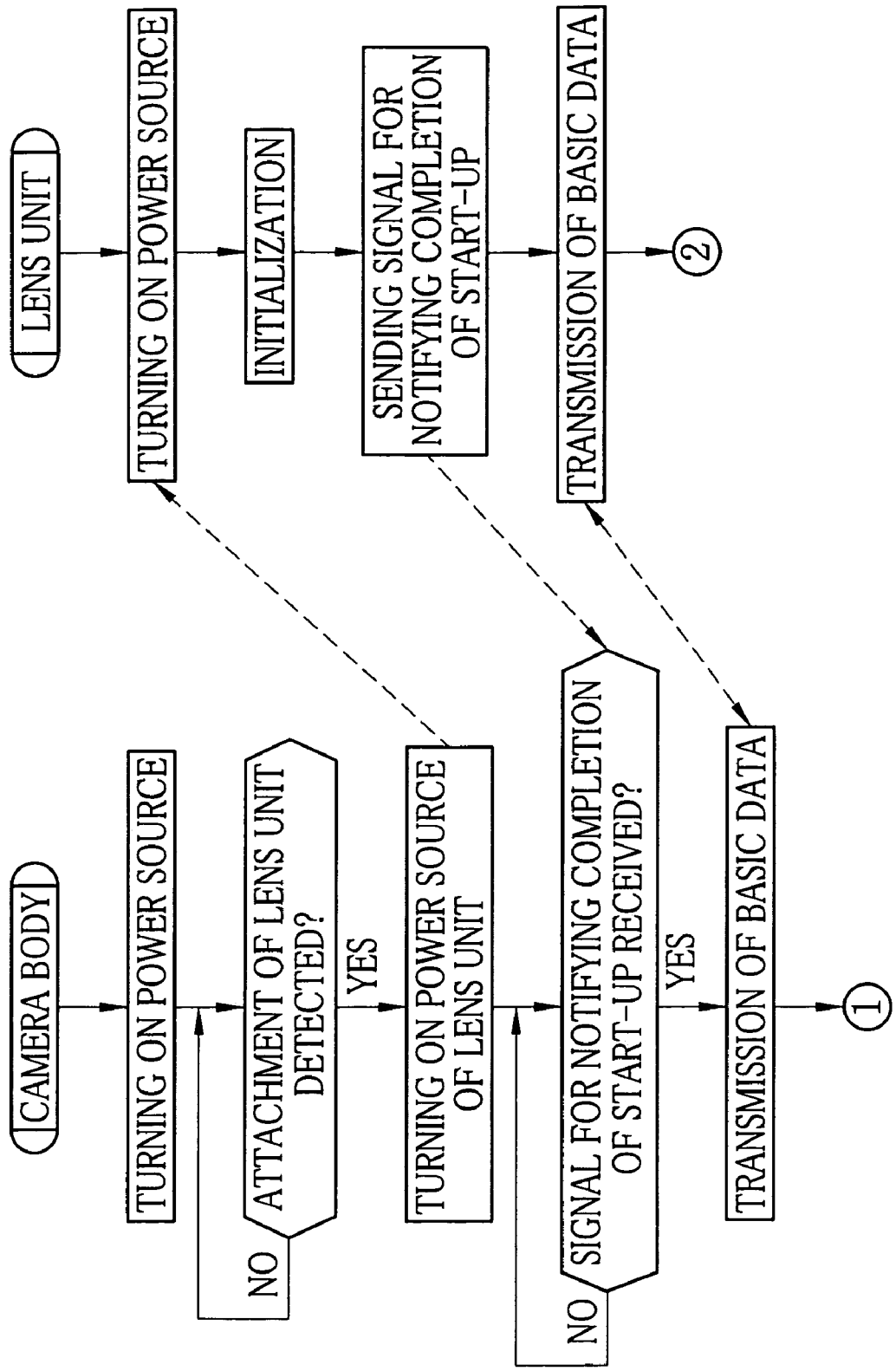
FIG. 7 is a flowchart showing an operational procedure of the camera body and the lens unit.
Figure 8:
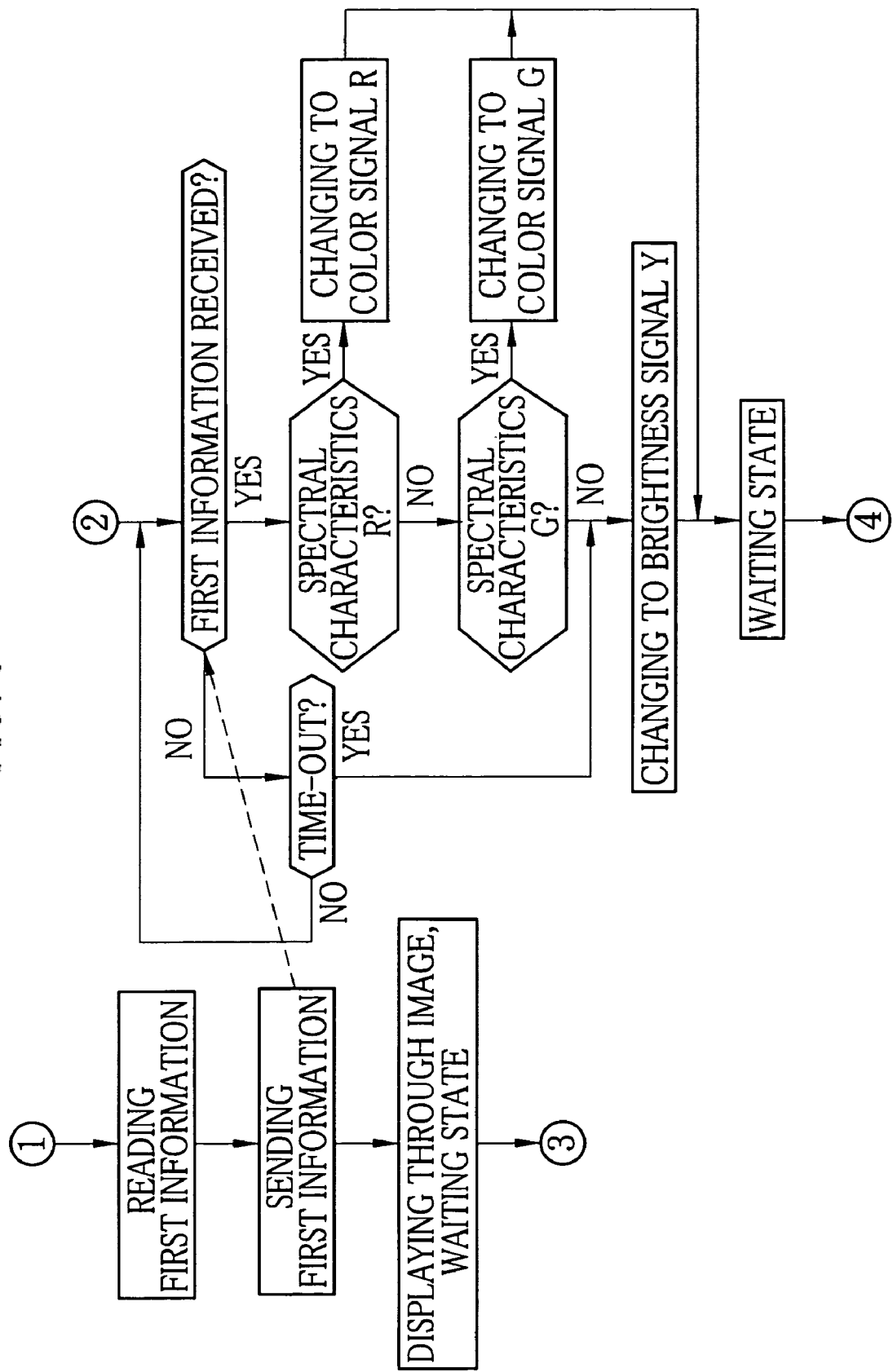
FIG. 8 is a flowchart showing the operational procedure of the camera body and the lens unit.

In FIG. 7, at the moment when the attachment detector 69 has detected the attachment of the lens unit 11 and the camera body 2a, the electric power is supplied from the power supplier 70 of the camera body 2a to the power supplier 108 of the lens unit 11 to turn on the power source of the lens unit 11. In the lens unit 11, initialization is performed in association with power-on. As to the initialization, the taking lens 10 is moved to a home position, for example.

After the initialization, a signal for notifying completion of start-up is sent from the lens unit 11 to the camera body 2a. And then, basic data necessary for actuating the electronic camera 2 is transmitted between the camera body 2a and the lens unit 11. The basic data includes a pixel number of the CCD 99, a frame rate for displaying a through image, a settable shutter speed, an f-number and so forth. At this time, as shown in FIG. 8, the first information is read out of the nonvolatile memory 53 under control of the CPU 50 in the camera body 2a. The read first information is sent to the lens unit 11 as part of the transmission of the basic data.

In the lens unit 11, the received first information is compared with the second information stored in the nonvolatile memory 93. When the first information represents the red spectral characteristics, the selector switch 106 is changed to the terminal of the color signal R under control of the CPU 90. Meanwhile, when the first information represents the green spectral characteristics, the selector switch 106 is changed to the terminal of the color signal G.

When the first information does not represent both of the red and green spectral characteristics or when the first information is not received within a predetermined period, the selector switch 106 is changed to the terminal of the brightness signal Y. In this way, the spectral characteristics of the auxiliary light are conformed to the spectral characteristics of the color signal inputted into the AE/AF detection circuit 105. After completing the transmission of the basic data and terminating the operation of the selector switch 106, the camera body 2a and the lens unit 11 are kept in a waiting state.

In the waiting state, the subject image having entered the CCD 99 through the taking lens 10 and the stop 94 is photoelectrically converted under the still-image shooting mode. For the photoelectrically converted subject image, sampling and amplification are performed by the analog-signal processing circuit 101. After that, the subject image is converted into the digital image data by the A/D 102.

The image data digitally converted by the A/D 102 is transferred to the camera body 2a after the digital-signal processing circuit 103 has performed the various processes therefor. In the camera body 2a, the digital image data received from the lens unit 11 is stored in the frame memory 60 and is displayed on the LCD 31 via the LCD driver 61 as the through image.

Figure 9:
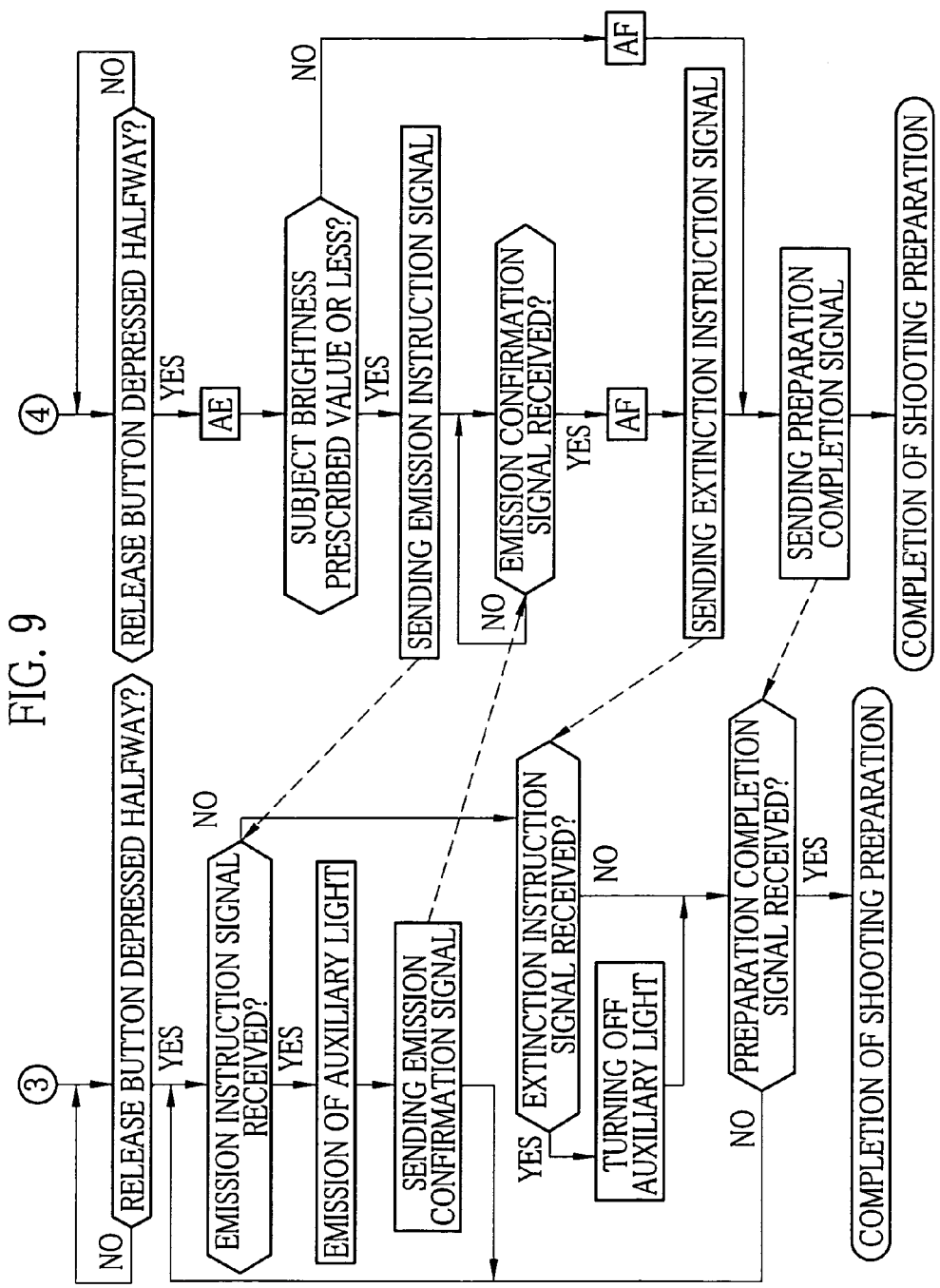
FIG. 9 is a flowchart showing the operational procedure of the camera body and the lens unit.

Upon depressing the release button 21 halfway in this state, subject brightness is detected by the AE/AF detection circuit 105 as shown in FIG. 9. The automatic exposure adjustment is executed to adjust the f-number, the shutter speed and so forth such that the exposure amount matches the subject brightness.

When the subject brightness detected by the AE/AF detection circuit 105 is a prescribed value or less, a signal for instructing the emission of the auxiliary light (hereinafter referred to as emission instruction signal) is sent from the lens unit 11 to the camera body 2a. Meanwhile, when the detected subject brightness is more than the prescribed value, the automatic exposure adjustment described later is executed.

When the emission instruction signal is received from the lens unit 11, the CPU 50 of the camera body 2a turns on the LED 80 of the auxiliary-light emitting device 62 via the auxiliary-light control circuit 63. In virtue of this, the auxiliary light is emitted from the auxiliary-light window 20 toward the subject. After emitting the auxiliary light, a signal for confirming the emission of the auxiliary light (hereinafter referred to as emission confirmation signal) is sent from the camera body 2a to the lens unit 11.

Upon receiving the emission confirmation signal from the camera body 2a, the automatic focus adjustment is executed by the AE/AF detection circuit 105 of the lens unit 11 and the focus evaluation value is calculated while the focus lens of the taking lens 10 is moved. At this time, the signal having the spectral characteristics, which coincide with those of the auxiliary light, is inputted into the AE/AF detection circuit 105 by means of the selector switch 106. After the automatic focus adjustment, a signal for instructing extinction of the auxiliary light (hereinafter referred to as extinction instruction signal) is sent from the lens unit 11 to the camera body 2a.

Upon receiving the extinction instruction signal from the lens unit 11, the CPU 50 of the camera body 2a turns off the LED 80 of the auxiliary-light emitting device 62 via the auxiliary-light control circuit 63. And then, a signal for notifying completion of shooting preparation (hereinafter referred to as preparation completion signal) is sent from the lens unit 11 to the camera body 2a. In this way, the shooting preparation process is completed.

After completing the shooting preparation process, shooting is performed upon full-depression of the release button 21. At this moment, the image data stored in the frame memory 60 is companded by the image companding circuit 57 and is stored in the memory card 59 via the card I/F 58.

As described above in detail, the electronic camera 2 operates the selector switch 106 on the basis of the comparison result of the first information representing the spectral characteristics of the auxiliary light, and the second information representing the spectral characteristics of the color signal, which is changeable by the selector switch 106. In virtue of this, the spectral characteristics of the auxiliary light coincide with the spectral characteristics of the color signal inputted into the AE/AF detection circuit 105. Thus, error of focus detection is prevented from occurring due to influence of the auxiliary light.

Since the first information is sent and received at the timing of attachment of the lens unit 11 detected by the attachment detector 69, it is possible to save the effort that setting of the selector switch 106 is manually changed in exchanging the lens unit. Further, it is possible to always perform the shooting under suitable conditions.

When the first information does not coincide with the second information or when the first information is not received, the brightness signal Y is inputted into the AE/AF detection circuit 105. Thus, it is possible to deal with the auxiliary light having any spectral characteristics. Moreover, it is prevented to cause a problem in that the auxiliary light is not emitted and the automatic focus adjustment cannot be performed.

In the above embodiment, the brightness signal Y is inputted into the AE/AF detection circuit 105 at the time of the normal automatic focus adjustment. However, the signal to be inputted into the AE/AF detection circuit 105 may be properly selected from among the brightness signal Y and the color signals R and G in the lens unit 11.

Figure 10:
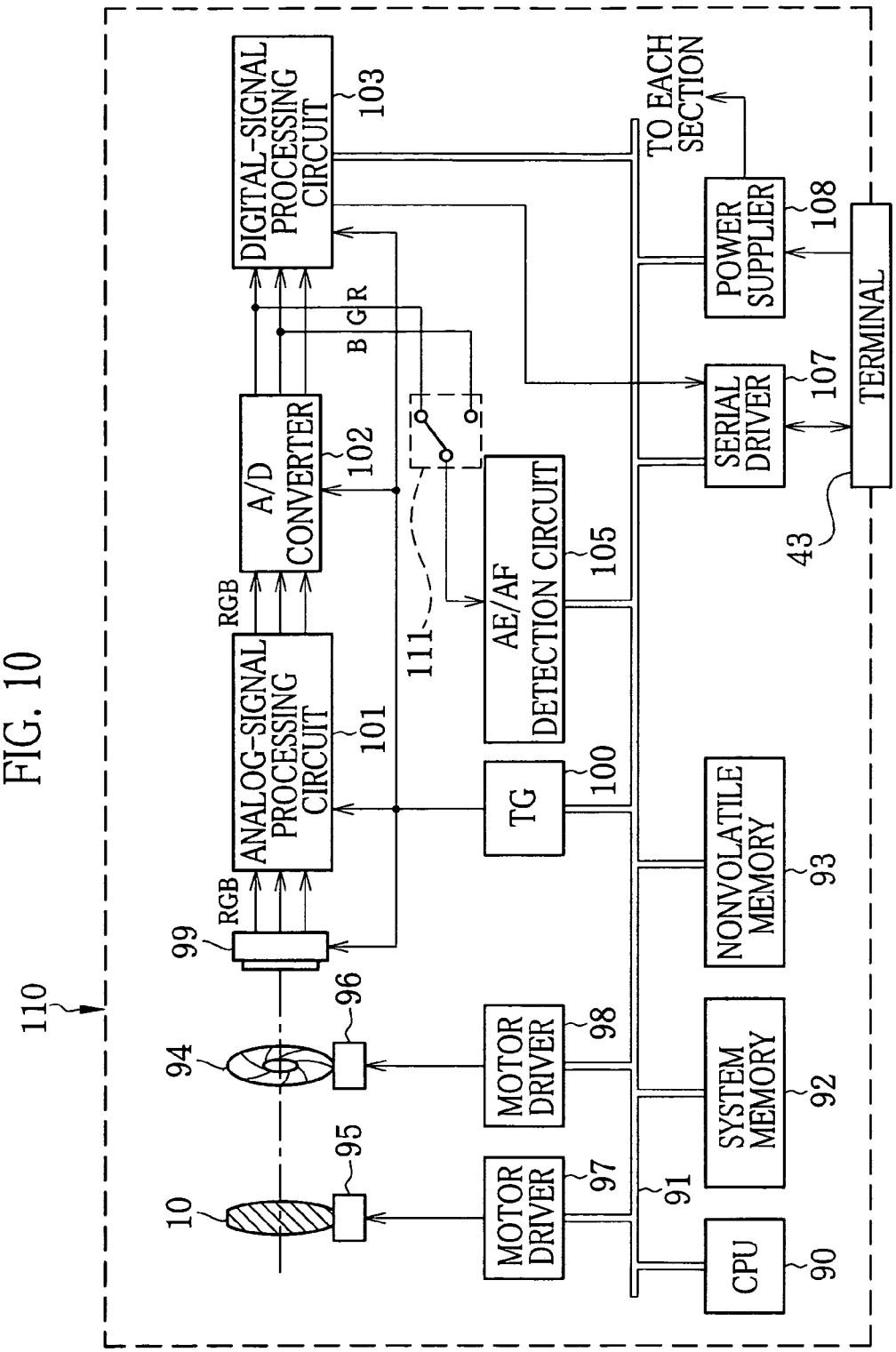
FIG. 10 is a block diagram showing another embodiment of the lens unit.
Figure 11:
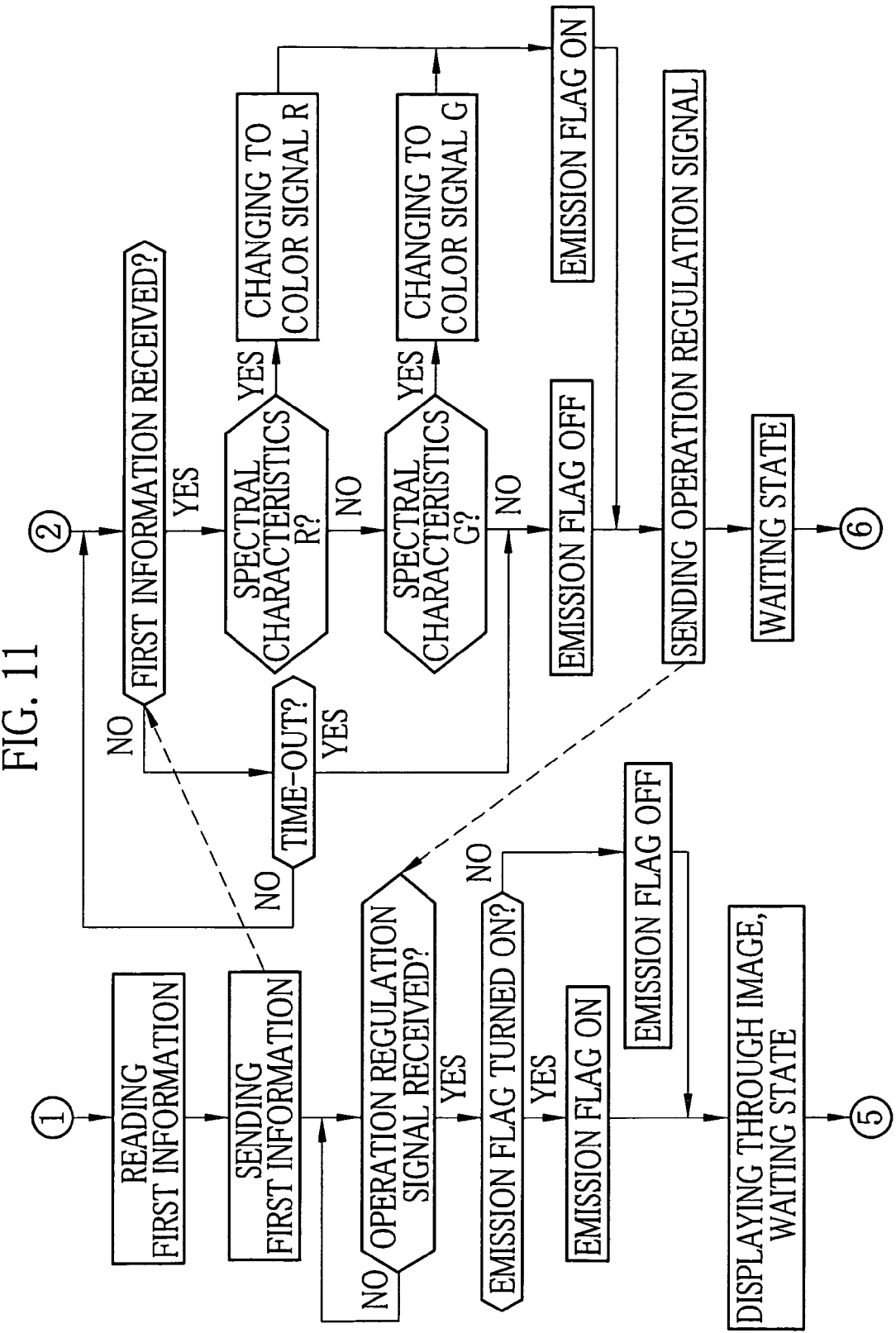
FIG. 11 is a flowchart showing an operational procedure of the camera body and the lens unit in a case that the lens unit shown in FIG. 10 is used.

Incidentally, the present invention is available for a lens unit 110 shown in FIG. 10. The lens unit 110 does not include the brightness-signal producing circuit. In this case, a selector switch 111 is capable of changing only the color signals R and G. As shown in FIG. 11, when the first information does not correspond to the red and green spectral characteristics and does not coincide with the second information or when the first information is not received, an emission flag for indicating permission of the auxiliary-light emission is turned off (the emission flag is turned on when the first information coincides with the second information). Further, a signal for regulating the operation of the auxiliary-light emitting device 62 (hereinafter referred to as operation regulation signal) is sent from the lens unit 110 to the camera body 2a.

Figure 12:
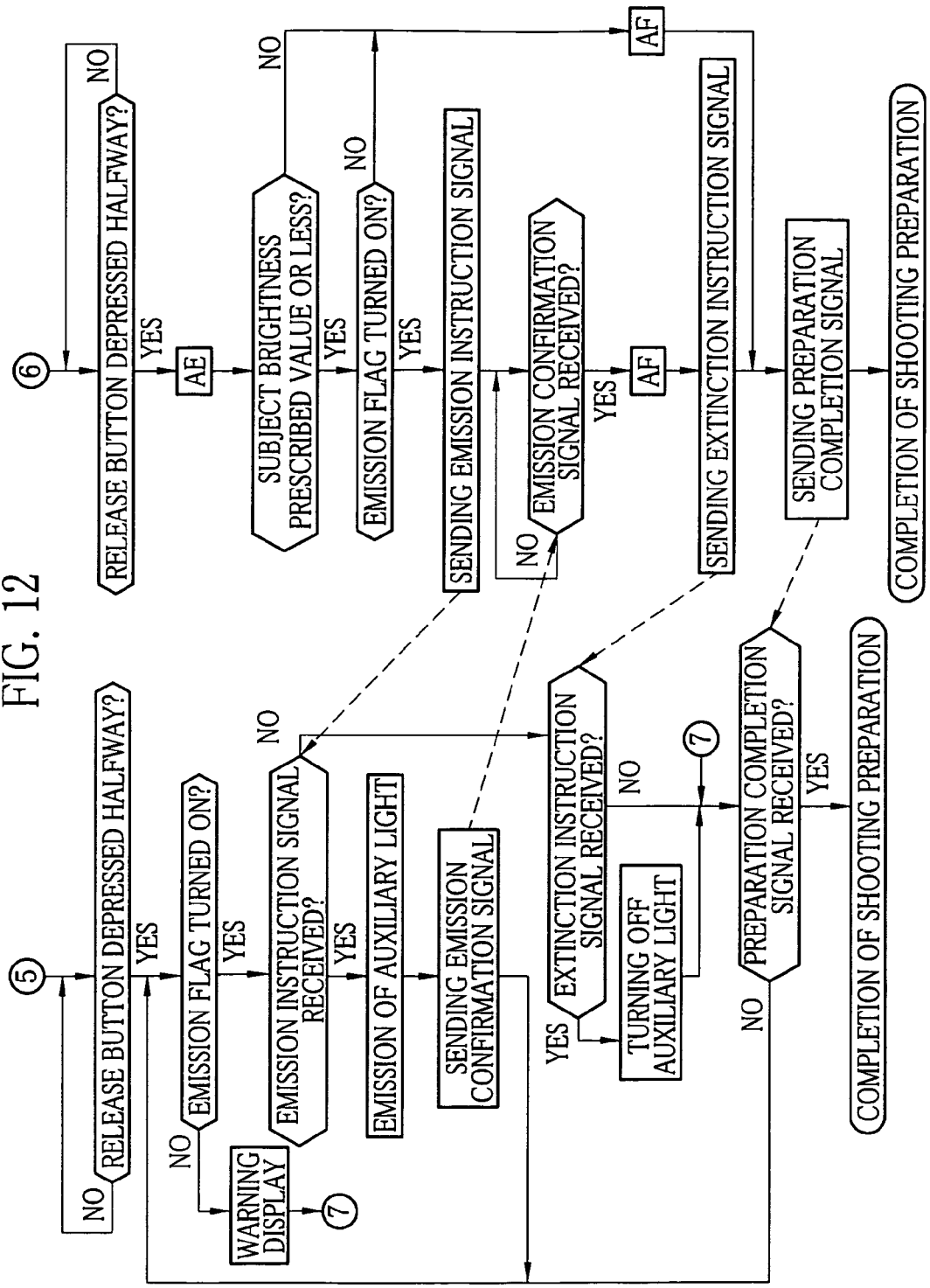
FIG. 12 is a flowchart showing the operational procedure of the camera body and the lens unit in the case that the lens unit shown in FIG. 10 is used.

Upon receiving the operation regulation signal from the lens unit 110, the emission flag of the camera body 2a is turned on or off in accordance with the content of the operation regulation signal. As shown in FIG. 12, when the emission flag is turned off at the moment that the shooting preparation process has been started by depressing the release button 21 halfway, the emission instruction signal is not sent from the lens unit 110 to the camera body 2a after completion of the automatic exposure adjustment even if the subject brightness is the prescribed value or less. And then, the process of the lens unit 110 is changed to the automatic focus adjustment.

Figure 13:
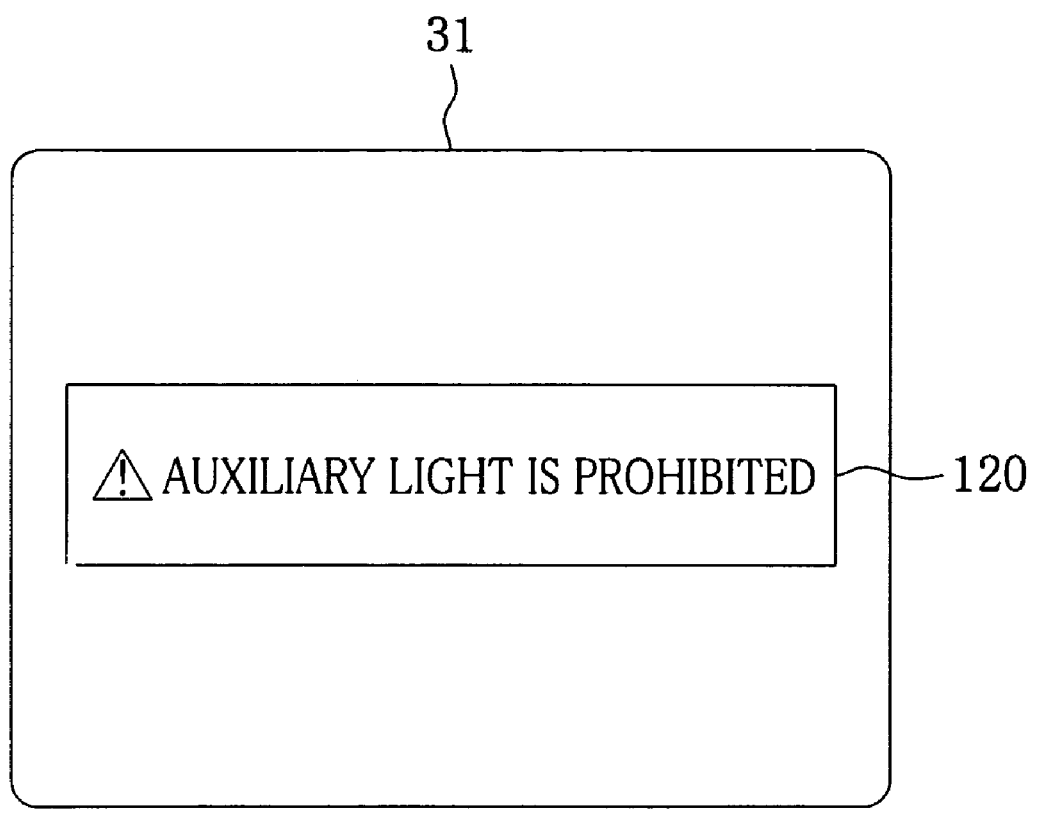
FIG. 13 is an illustration showing a state in that a warning message is displayed on an LCD.

Meanwhile, even if the camera body 2a receives the emission instruction signal from the lens unit 110, the auxiliary light is not emitted when the emission flag is turned off. At this time, as shown in FIG. 13, a warning message 120 is displayed on the LCD 31 to inform that the auxiliary-light emitting device 62 is inactive. In virtue of this, the wasted emission of the auxiliary light is reduced and electric power consumption is saved. As to the method for informing that the auxiliary-light emitting device 62 is inactive, it is considered to use a warning lamp, sound, vibration and so forth instead of or in addition to the display of the warning message 120. Incidentally, when the emission flag is turned off, a signal for banning the activation of the auxiliary-light emitting device 62 may be sent from the lens unit 110 to the camera body 2a.

In the above embodiments, the spectral characteristics of the auxiliary light and the spectral characteristics of the color signal to be inputted into the AE/AF detection circuit 105 are conformed in the lens units 11 and 110. On the contrary, however, it may be performed in the camera body to conform the spectral characteristics of the auxiliary light to the spectral characteristics of the color signal to be inputted into the AE/AF detection circuit 105. An embodiment of this case is described below with reference to FIGS. 14 to 17.

Figure 15:
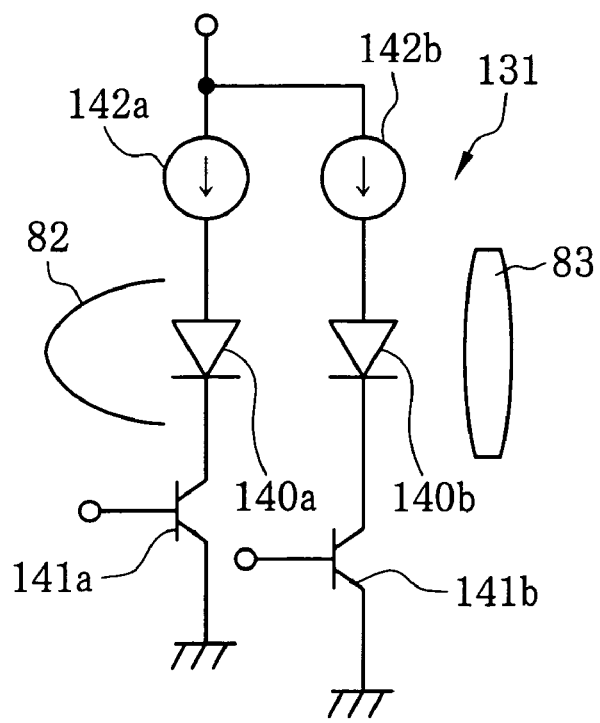
FIG. 15 is a schematic illustration showing a structure of an auxiliary-light emitting device of the camera body shown in FIG. 14.
Figure 14:
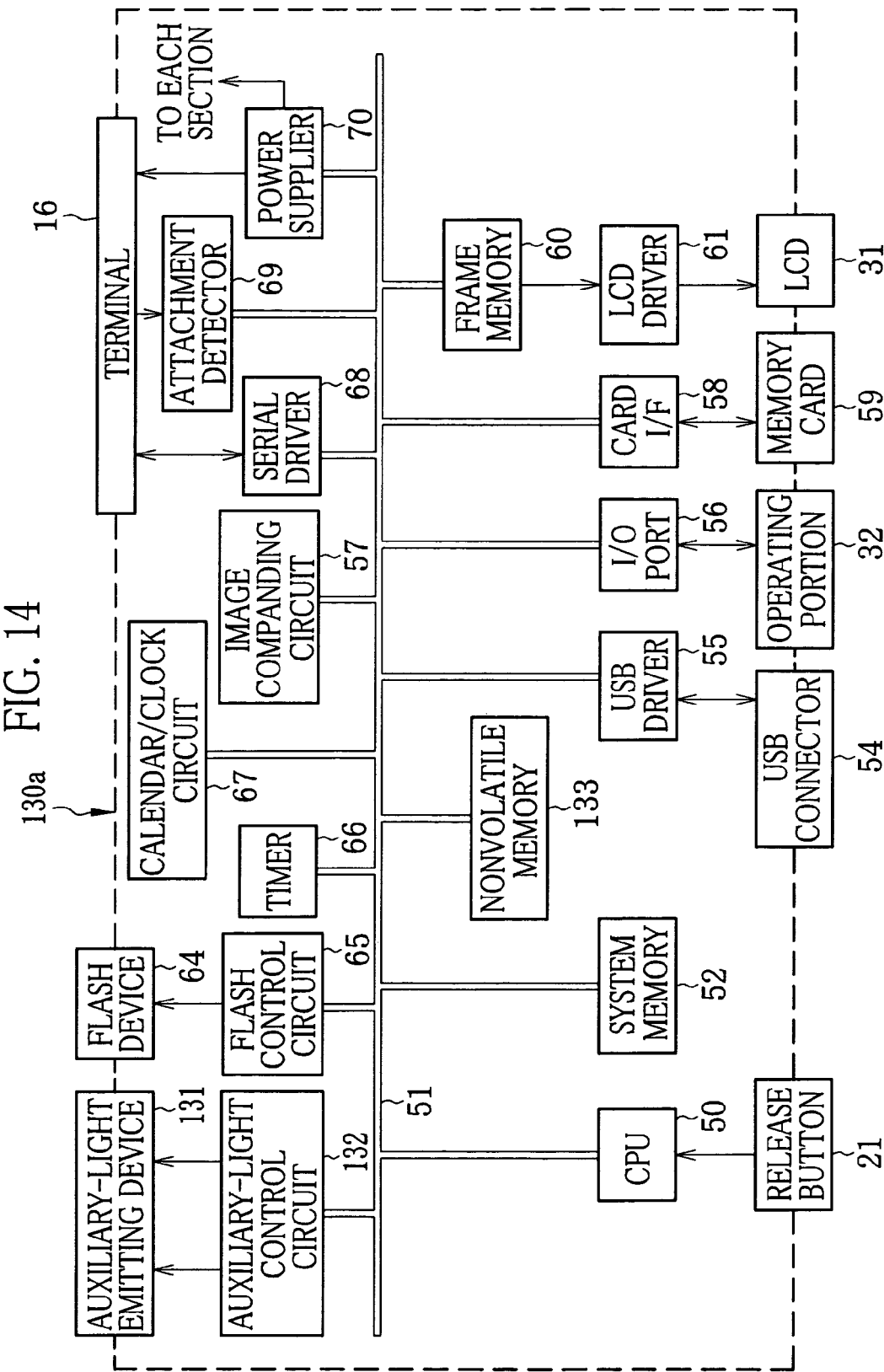
FIG. 14 is a block diagram showing another embodiment of the camera body.

A camera body 130a shown in FIG. 14 comprises an auxiliary-light emitting device 131 for emitting a plurality of auxiliary lights having different spectral characteristics and to be used for autofocus. As shown in FIG. 15, the auxiliary-light emitting device 131 includes two LEDs of a red LED 140a and a green LED 140b which are independently turned on and off by transistors 141a and 141b of an auxiliary-light control circuit 132. The auxiliary-light emitting device 131 further includes constant current sources 142a and 142b respectively connected to the LEDs 140a and 140b. Information (hereinafter referred to as first information) representing the spectral characteristics of the auxiliary lights, which are changeable by the transistors 141a and 141b, is stored in a nonvolatile memory 133 (see FIG. 14).

A lens unit 150 shown in FIG. 16 includes an AE/AF detection circuit 151 for performing various processes of AE and AF on the basis of the color signal (G in this embodiment) outputted from the A/D 102. Information (hereinafter referred to as second information) representing the spectral characteristics of the color signal is stored in a nonvolatile memory 152.

Figure 17:
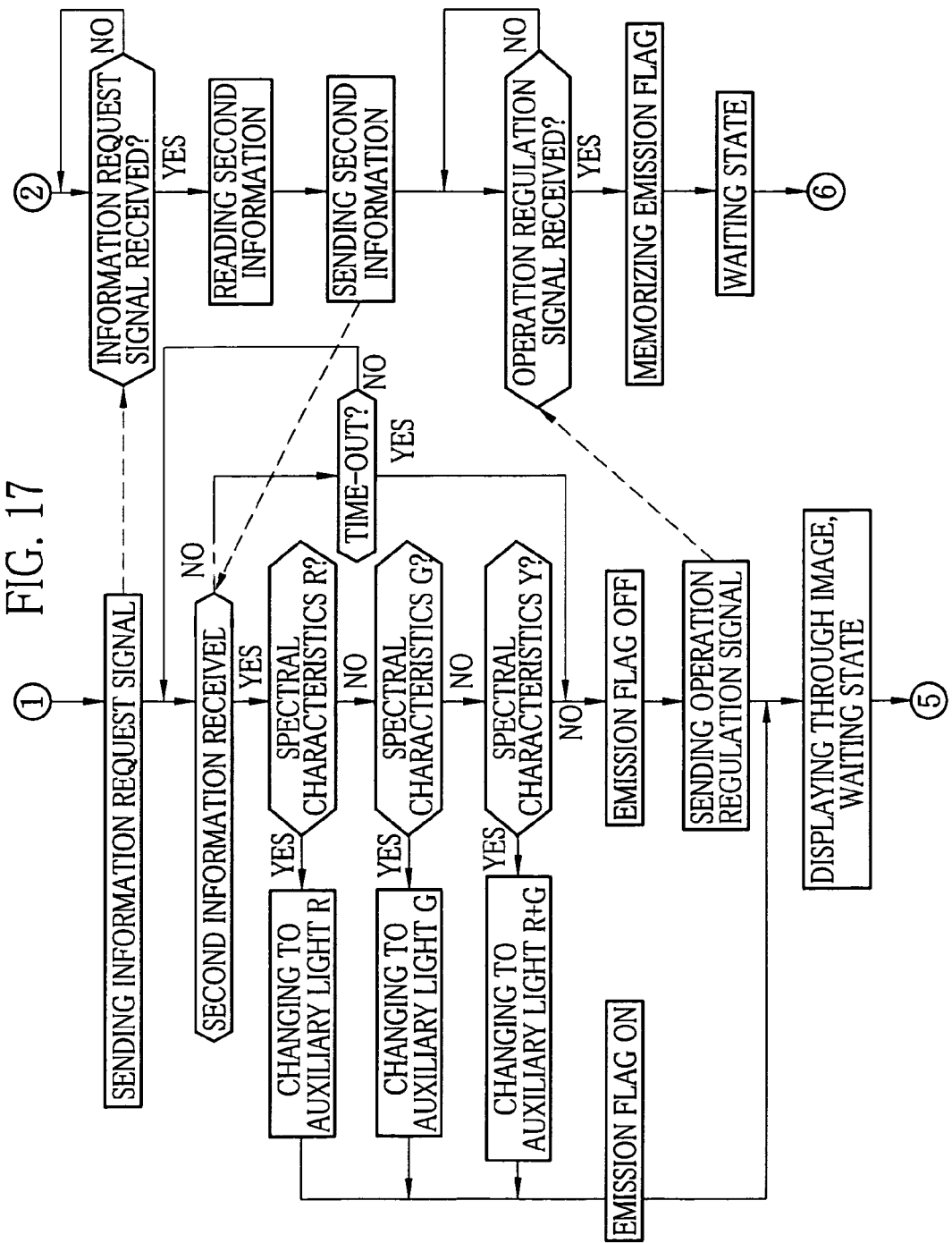
FIG. 17 is a flowchart showing an operational procedure of the camera body and the lens unit in a case that the camera body shown in FIG. 14 and the lens unit shown in FIG. 16 are used.

With respect to the embodiment using the lens unit 150 and the camera body 130a having the above stricture, an operation thereof is described below with reference to a flowchart shown in FIG. 17. First of all, the processes of the initialization, the transmission of the basic data, and so forth shown in FIG. 7 are performed. After completing these processes, a signal for requesting the second information (hereinafter referred to as information request signal) is sent from the camera body 130a to the lens unit 150 as part of the transmission of the basic data.

In the lens unit 150, the second information is read out of the nonvolatile memory 152 under the control of the CPU 90 upon receiving the information request signal from the camera body 130a. The read information is sent to the camera body 130a.

In the camera body 130a, the received second information is compared with the first information stored in the nonvolatile memory 133. When the second information represents the red spectral characteristics, the red LED 140a is turned on by the transistor 141a under the control of the CPU 90. When the second information represents the green spectral characteristics, the green LED 140b is turned on by the transistor 141b. When the second information represents the spectral characteristics of the brightness signal Y, both of the red LED 140a and the green LED 140b are turned on by the transistors 141a and 141b. In this way, the spectral characteristics of the auxiliary light and the spectral characteristics of the color signal to be inputted into the AE/AF detection circuit 105 are conformed in the camera body 130a.

In the meantime, when the second information does not represent the spectral characteristics of red, green and the brightness signal Y or when the second information is not received within a predetermined period, the emission flag is turned off. After that, the operation regulation signal indicating the state of the emission flag is sent from the camera body 130a to the lens unit 150. The operation regulation signal received by the lens unit 150 is stored therein. Successively, processes such as shown in FIG. 12 are performed and the shooting preparation process is completed.

It is needless to say that the embodiment shown in FIGS. 14 to 17 wherein the spectral characteristics are conformed in the camera body has similar effects with the foregoing embodiments wherein the spectral characteristics are conformed in the lens unit 11.

In the above embodiments, the brightness signal Y and the color signals R and G are used for calculating the focus evaluation value. However, the other signals may be used. It is possible to properly change the signals in accordance with specification of the device.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An interchangeable lens camera in which a lens unit is detachably attached to a camera body, said lens unit including a solid-state image sensor for taking a subject image having passed through an imaging optical system, said interchangeable lens camera comprising:

A. said camera body including:
 an auxiliary-light emitter for emitting auxiliary light to be used for autofocus;
 a first memory for storing first information representing spectral characteristics of said auxiliary light;
 a first communication section for communicating various signals with said lens unit;
 a first controller for controlling operations of the respective parts of said camera body, said first controller reading said first information from said first memory and sending said first information to said lens unit via said first communication section;

B. said lens unit including:

a focus-evaluation-value calculator for calculating a focus evaluation value representing sharpness of said subject image;

a second memory for storing second information representing spectral characteristics of each of color signals;

a selector for changing the color signal to be inputted into said focus-evaluation-value calculator;

a second communication section for communicating the various signals with said camera body via said first communication section; and a second controller for controlling operations of the respective parts of said lens unit, said second controller comparing said first information, which is received from said camera body via said second communication section, with said second information stored in said second memory, and said second controller operating said selector such that the color signal corresponding to said second information identical with said first information is inputted into said focus-evaluation-value calculator.

2. The interchangeable lens camera according to claim 1, wherein at least one of said camera body and said lens unit includes an attachment detector for detecting attachment of said lens unit to said camera body, and said first and second communication sections perform transmission of said first information after said attachment detector has detected the attachment.

3. The interchangeable lens camera according to claim 1, wherein said lens unit further includes a brightness-signal producer for producing a brightness signal from said color signal, and said selector is adapted to be capable of selecting said brightness signal in addition to said color signal, said second controller operating said selector so as to input said brightness signal into said focus-evaluation-value calculator when said first information discords with said second information or when said first information is incapable of being received.

4. The interchangeable lens camera according to claim 1, wherein said second controller sends a signal, by which said auxiliary-light emitter is prevented from being activated, to said camera body when said first information discords with said second information or when said first information is incapable of being received.

5. The interchangeable lens camera according to claim 4, wherein said camera body further includes a display for indicating that said auxiliary-light emitter is inactive.

6. The interchangeable lens camera according to claim 5, wherein said display is a liquid-crystal display disposed at a rear surface of said camera body.

7. The interchangeable lens camera according to claim 1, wherein said auxiliary-light emitter comprises:

a single LED for emitting said auxiliary light;

a constant current source for supplying electric power to said LED;

a reflector for reflecting said auxiliary light toward a subject; and a condenser lens for condensing said auxiliary light toward the center of an angle of view.

8. A lens unit including a solid-state image sensor for taking a subject image having passed through an imaging optical system, said lens unit being detachably attached to a camera body of an interchangeable lens camera and comprising:

a focus-evaluation-value calculator for calculating a focus evaluation value representing sharpness of said subject image;

a selector for changing a color signal to be inputted into said focus-evaluation-value calculator;

a memory for storing first information representing spectral characteristics of the color signal which is changeable by said selector;

a communication section for communicating various signals with said camera body; and a controller for controlling operations of the respective parts of said lens unit, said controller comparing said first information with second information, which is received from said camera body via said communication section and represents spectral characteristics of auxiliary light to be used for autofocus, and said controller operating said selector on the basis of a result of the comparison such that the color signal having the spectral characteristics identical with said second information is inputted into said focus-evaluation-value calculator.

9. A camera body of an interchangeable lens camera, to which a lens unit including a solid-state image sensor for taking a subject image having passed through an imaging optical system is detachably attached, said camera body comprising:

an auxiliary-light emitter for emitting auxiliary light to be used for autofocus;

a memory for storing information representing spectral characteristics of said auxiliary light;

a communication section for communicating various signals with said lens unit; and a controller for controlling operations of the respective parts of said camera body, said controller reading said information from said memory and sending the read information to said lens unit via said communication section.

10. An interchangeable lens camera in which a lens unit is detachably attached to a camera body, said lens unit including a solid-state image sensor for taking a subject image having passed through an imaging optical system, said interchangeable lens camera comprising:

A. said camera body including:

an auxiliary-light emitter capable of emitting plural kinds of auxiliary light to be used for autofocus, said plural kinds of the auxiliary light having different spectral characteristics;

a first memory for storing first information representing spectral characteristics of said auxiliary light;

a selector for changing one of said plural kinds of the auxiliary light to be emitted;

a first communication section for communicating various signals with said lens unit;

a first controller for controlling operations of the respective parts of said camera body;

B. said lens unit including:

a focus-evaluation-value calculator for calculating a focus evaluation value representing sharpness of said subject image;

a second memory for storing second information representing spectral characteristics of a color signal to be inputted into said focus-evaluation-value calculator;

a second communication section for communicating the various signals with said camera body via said first communication section; and a second controller for controlling operations of the respective parts of said lens unit;

wherein said second controller reads said second information from said second memory and sends the read second information to said first communication section via said second communication section, and said first controller compares said first information, which is stored in said first memory, with said second information, said first controller operating said selector on the basis of a result of the comparison such that the auxiliary light having the spectral characteristics identical with said second information is emitted from said auxiliary-light emitter.

11. The interchangeable lens camera according to claim 10, wherein at least one of said camera body and said lens unit includes an attachment detector for detecting attachment of said lens unit to said camera body, and said first and second communication sections perform transmission of said second information after said attachment detector has detected the attachment.

12. The interchangeable lens camera according to claim 10, wherein said first controller prevents said auxiliary-light emitter from being activated when said first information discords with said second information or when said second information is incapable of being received.

13. The interchangeable lens camera according to claim 12, wherein said camera body includes a display for indicating that said auxiliary-light emitter is inactive.

14. The interchangeable lens camera according to claim 13, wherein said display is a liquid-crystal display disposed at a rear surface of said camera body.

15. The interchangeable lens camera according to claim 10, wherein said auxiliary-light emitter comprises:
a plurality of LEDs for emitting said auxiliary light;
a plurality of constant current sources for supplying electric power to the corresponding LEDs;
a plurality of switching elements connected to the respective LEDs; and
a reflector for reflecting said auxiliary light toward a subject.

16. The interchangeable lens camera according to claim 15, wherein said selector changes said auxiliary light by performing on-off control of said switching elements.

17. A lens unit including a solid-state image sensor for taking a subject image having passed through an imaging optical system, said lens unit being detachably attached to a camera body of an interchangeable lens camera and comprising:
a focus-evaluation-value calculator for calculating a focus evaluation value representing sharpness of said subject image;
a memory for storing information representing spectral characteristics of a color signal to be inputted into said focus-evaluation-value calculator;
a communication section for communicating various signals with said camera body; and
a controller for controlling operations of the respective parts of said lens unit, said controller reading said information from said memory and sending the read information to said camera body via said communication section.

18. A camera body of an interchangeable lens camera, to which a lens unit including a solid-state image sensor for taking a subject image having passed through an imaging optical system is detachably attached, said camera body comprising:
an auxiliary-light emitter capable of emitting plural kinds of auxiliary light to be used for autofocus, said plural kinds of the auxiliary light having different spectral characteristics;
a memory for storing first information representing spectral characteristics of said auxiliary light;
a selector for changing one of said plural kinds of the auxiliary light to be emitted;
a communication section for communicating various signals with said lens unit; and
a controller for controlling operations of the respective parts of said camera body, said controller comparing said first information with second information, which is received from said lens unit via said communication section and represents spectral characteristics of a color signal to be used for calculating a focus evaluation value, and said controller operating said selector on the basis of a result of the comparison such that the auxiliary light having the spectral characteristics identical with said second information is emitted from said auxiliary-light emitter.

* * * * *